June 24, 1941.   C. O. COZZENS   2,246,507
OPHTHALMIC MOUNTING
Filed May 25, 1938
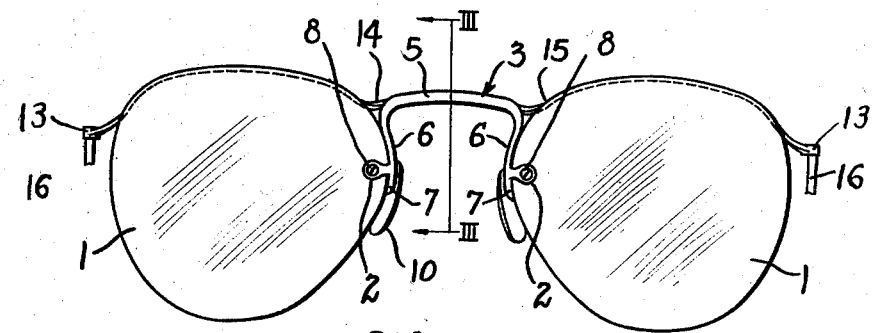
Fig. I
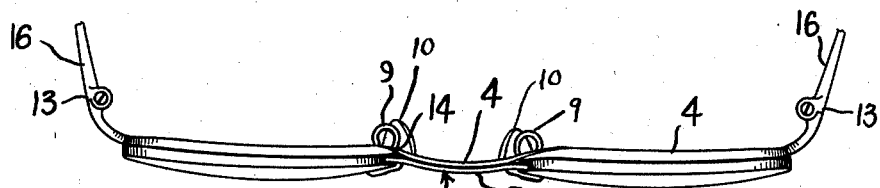
Fig. II
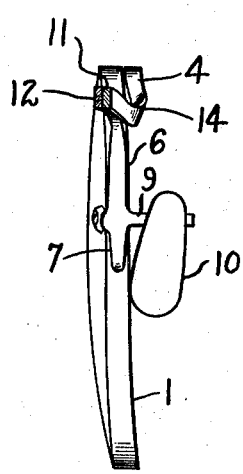
Fig. III
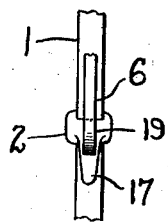
Fig. IV
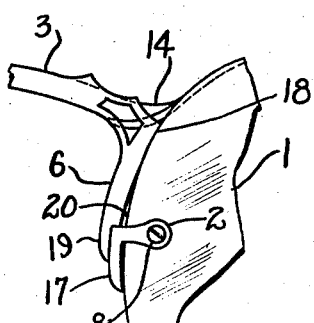
Fig. V
INVENTOR
CHARLES O. COZZENS
BY
Harry H. Stull
ATTORNEY Patented June 24, 1941

2,246,507

UNITED STATES PATENT OFFICE 2,246,507

OPHTHALMIC MOUNTING

Charles O. Cozzens, Southbridge, Mass., assignor to American Optical Company, Southbridge, Mass., a voluntary association of Massachusetts Application May 25, 1938, Serial No. 210,006

2 Claims. (Cl. 88—47)

This invention relates to improvements in ophthalmic mountings and has particular reference to an improved construction of mounting.

One of the principal objects of this invention is to provide an ophthalmic mounting which is designed to give the appearance of a rimless construction and yet preserve, to a substantial degree, the strength of a frame construction.

Another object of the invention is to provide a novel construction of an opthalmic mounting of the type having temple supporting portions which have no positive connection with the lens.

Another object is to provide an ophthalmic mounting having a temple supporting bar-like member extending laterally transversely of the mounting and being attached thereto only by its connection with the bridge member.

Another object is to provide supporting means for an ophthalmic mounting comprising a bar-like member centrally attached to the bridge, and having temple joining portions at each end, the intermediate portions of said bar-like member being free to flex in all directions.

Another object is to provide a support for an ophthalmic mounting which has a central portion attached to the bridge member, twisted portions immediately adjacent the bridge member, and lateral portions following the upper contour edges of the lenses, whereby each face in the lateral portions lies in a plane substantially normal to that of the same face in the central portion.

Another object of the invention is to provide a unitary support for the temples of an opthalmic mounting of a rimless spectacle type which is substantially invisible when the mounting is viewed from the front, which will relieve shock and strain on the lenses when the temples are displaced upwardly or downwardly relative to the lenses, and which will relieve strain on the lenses when the temples are bowed outwardly as when placing the mounting on the face.

Another object is to provide a novel construction of bridge and lens holding means.

Another object is to provide temple supporting portions which may be rigid, pliable, or resilient, or of such a nature as to have all of said characteristics; that is, having portions thereof formed with one or more of the above characteristics and other portions having different characteristics.

Another object is to provide adjustable temple supports which may be adjusted to meet the facial requirements of different individuals independently of the lenses.

Still another object is to provide an ophthalmic mounting having a bridge member with a portion thereof bearing on the periphery of the lens so as to cooperate with the lens connecting means in such a manner as to strengthen the connection to the lens.

Other objects and advantages of the invention should become apparent from the following description taken in connection with the accompanying drawing, and it will be apparent that many changes may be made in the details of construction and arrangement of parts, shown and described without departing from the spirit of the invention as expressed in the accompanying claims. I, therefore, do not wish to be limited to the exact details shown and described as the preferred forms only have been given by way of illustration.

Referring to the drawing:

Fig. I is a front elevation of an ophthalmic mounting embodying the invention;

Fig. II is a plan view of the device shown in Fig. I;

Fig. III is an enlarged sectional view taken on line III—III of Fig. I and looking in the direction indicated by the arrows;

Fig. IV is a fragmentary view similar to Fig. III of a modified construction of bridge and lens holding means; and Fig. V is a fragmentary front elevation illustrating the construction shown in Fig. IV.

It has been usual in the past to provide two major types of ophthalmic mountings, one of which is known in the art as a frame type mounting, and the other, a rimless type mounting.

Rimless type mountings, although exceptionally desirable from the aesthetical viewpoint, have, in the past, been readily susceptible to shock and strain, resulting in the breakage of lenses. This strain, in many instances, was due to the fact that the temples were connected directly to the lens connecting means and was introduced during the outward bowing of the temples when placing the mounting on or removing it from the face. This strain in frame type mountings was substantially entirely eliminated, but such mountings had frame portions lying within the direct field of vision and were not as desirable from this standpoint as were rimless type mountings.

The present invention, therefore, is directed particularly to the provision of an ophthalmic mounting which will have all of the desirable features of a rimless type mounting and which will overcome the difficulties encountered in the past.

Referring more particularly to the drawing wherein like characters of reference designate like parts throughout the several views, the device embodying the invention comprises a pair of lenses 1, connected by suitable lens straps or lens holding means 2, to a bridge member 3.

The bridge member 3 is centrally connected to a bar-like temple supporting member 4 which extends laterally on both sides of its bridge connection, terminating in temple junction portions 13.

In its preferred form the bridge member 3 has a central arch portion 5 and integral depending portions 6, the lower portions of which are integrally connected with the lens holding means 2 by soldering or the like and are shaped substantially to the contour shape of the lens peripheries adjacent the said lens holding means. If desired, the depending portions 6 may be given a contour of less radius of curvature than the lens edge. It will be seen that this will result in having lens edge bearing points at the upper and lower ends of said depending portions 6, and the remainder of the depending portions overlying and in spaced relation with the lens peripheries.

The lens holding means 2 are connected to the lenses 1 by suitable means 8, which may be screws, rivets, solder united members or other means adapted to extend through suitable openings formed in the lenses and lens holding means at such distances from the edges of said lenses as to cause the lens holding means to fit snugly and relatively rigidly with the lenses. The lower edge engaging portions 7 of the straps 2, form, with the integral depending portions 6, means for supporting the lens against movement about the lens connecting means 8.

Arms 9 for supporting nose pads 10 may be connected to the depending portions 6 of the bridge 3 at any point along said depending portions, but preferably at the rear, and vertically in the same position as the lens straps 2.

This invention relates particularly to the bar-like supporting means 4, its position with respect to the other parts of the mounting, its contours, dimensions, angles, and extensions, the particulars of its connection to the bridge member 3, and the characteristics of the mounting which are the result of the above mentioned details.

This supporting member 4 preferably has a rectangular cross section as shown at 11 in Fig. III. This cross section, as illustrated, is, for practical purposes, substantially identical with the cross section of the central arch portion 5 of the bridge 3, as shown at 12 in Fig. III, and the supporting member is of a length sufficient to extend laterally from each side of the bridge 3, along and behind the upper peripheral edges of the lenses, to points adjacent the outer edges of the lenses 1, and then rearwardly and downwardly to the temple joining position 13.

The supporting member 4 is soldered or otherwise rigidly connected to the bridge 3 substantially throughout the central arch portion 5 thereof as by soldering, or the like, as illustrated in Fig. II, with the long side of its rectangular cross section positioned vertically and in such a manner as to cover the full area, or less, of the back of the central arch portion 5 of the bridge 3 and be substantially hidden by said arch portion when viewed from the front. This assembled position is illustrated at 11 and 12 in Fig. III.

The supporting member 4 immediately adjacent and at both ends of its bridge connection, is provided with portions 14, which are twisted so that the wide face, of the supporting member's cross section, which faces forwardly at the bridge connection, as at 11, Fig. III, faces upwardly and is in a plane substantially at right angles to that of its previous position, when it reaches the lenses, as at 15, Fig. I, and so continues substantially throughout the width of the upper contour edges of the lenses. This twisting accomplishes a number of purposes, mainly that of changing the forward-facing side of the supporting member 4 from the wide face at the center to the narrow face on the laterally extending portions of the supporting member, as well as acting as a flexing and adjusting point and a beginning for the lens periphery following curve of the lateral extensions of the supporting member, and presenting sloping faces adjacent the ends of the arch portion 5 when viewed from the front, as illustrated at 14, Figures I and V.

Thus it will be seen that this construction tends to make the supporting member relatively invisible when viewed from the front since the central portion is hidden behind the bridge, the twisted portions present sloping faces, and the lateral extensions are positioned behind the lenses along the upper peripheral edges thereof and with their narrow faces forward, so that the illusion of a rimless mounting is encouraged.

The supporting member 4 follows the contour of the upper lens edges until said edges curve downwardly. The said member 4 follows these downward curves a short distance, then extends laterally beyond the edges of the lenses and at the same time extends downwardly and rearwardly a short distance, and ends in temple connection portions 13, at which points it is joined by temples 16.

It will readily be seen that the supporting member 4, if desired, could be made to lay over and on the upper peripheral edges of the lenses, instead of beside and to the rear, as shown in the preferred form, and also, that the member 4 may be twisted to a greater or less extent, or not at all, without departing from the spirit of the invention. It will also be seen that the positions of the temple connecting portions 13 are capable of considerable variation, up or down, back or forward, in or out, to suit the need or desire of an individual.

An alternate structure is illustrated in Figs. IV and V. In this type the lens 1 is attached to lens holding means 2 by connecting means 8. The strap 2 is unique in that it has only one strap shoe 17. This shoe is so constructed and assembled as to contact and bear on the peripheral edge of the lens below the connecting means 8. The upper end 18 of the depending portion 6 of the bridge 3 contacts and bears on the peripheral edge of the lens above the connecting means, and the lower end 19 is fitted and soldered or otherwise attached to the side of the strap shoe opposite from that which bears on the edge of the lens, thus providing a space 20 between the depending portion 6 and the peripheral edge of the lens intermediate the ends of said depending portion and also providing two separate bearing points on the peripheral edge of the lens on opposite sides of the connecting means. This construction gives strength and rigidity to the mounting and acts as means for resiliently supporting the lens against movement about the lens connecting means 8.

From the foregoing it will be seen that I have provided a support for an ophthalmic mounting which is substantially invisible when the mounting is viewed from the front. This is due to its position behind the lenses. This support will relieve shock and strain on the lenses due to the long extensions between the bridge and the temples. It will also be seen that I have provided a mounting which has most of the advantages of both the rimless and frame type mountings of the prior art, which does away with many of the disadvantages of each, and has some advantages possessed by neither, such as its greater flexibility, adjustability, and strain free supporting characteristics.

Having described my invention, I claim:

1. An ophthalmic mounting comprising a pair of lenses joined by a bridge member having a central arch portion and a temple supporting bar-like member extending substantially throughout the width of the assembled lenses and bridge member and secured to said central arch portion of the bridge member with portions thereof progressing outwardly and shaped substantially to the upper contour shape of the lenses and terminating in temple connections, the major portion of said bar-like member being positioned in the rear of the lenses and central arch portion of the bridge member so as to be substantially invisible when the mounting is viewed from the front, the portions of the bar-like member shaped substantially to follow the upper contour shape of the lenses being disposed with their greatest dimensions in substantially horizontal planes and the portion positioned in the rear of the central arch portion of the bridge member being disposed with its greatest dimension in substantially a vertical plane with a semi-twist spaced from the secured portion of said bar-like member so as to remove flexing strain from said secured portion and joining said portion positioned in the rear of the bridge member with said portions following substantially the upper contour shape of the lenses.

2. In an ophthalmic mounting, bridge means for connecting a pair of lenses and a temple connecting bar extending in substantially a straight line throughout the width of the assembled lenses and bridge means and having a central portion secured to the said bridge means, twisted portions immediately adjacent but spaced from said secured central portion, and lateral portions extending from said twisted portions to follow the upper contour edges of the lenses, said lateral portions having temple connecting means adjacent each end thereof, each face in the lateral portions lying in a plane substantially normal to that of the same face in the said central portions and said twisted portions presenting sloping faces to the front, whereby the said bridge means and temple connecting bar co-act to present a substantially rimless appearing mounting when viewed from the front, and said twisted portions being adapted to permit flexing in all directions and to remove flexing strain from said secured central portion of said temple connecting bar.

CHARLES O. COZZENS